MULTIPLE PULSE COMMUNICATION SYSTEM
Filed Dec. 23, 1959
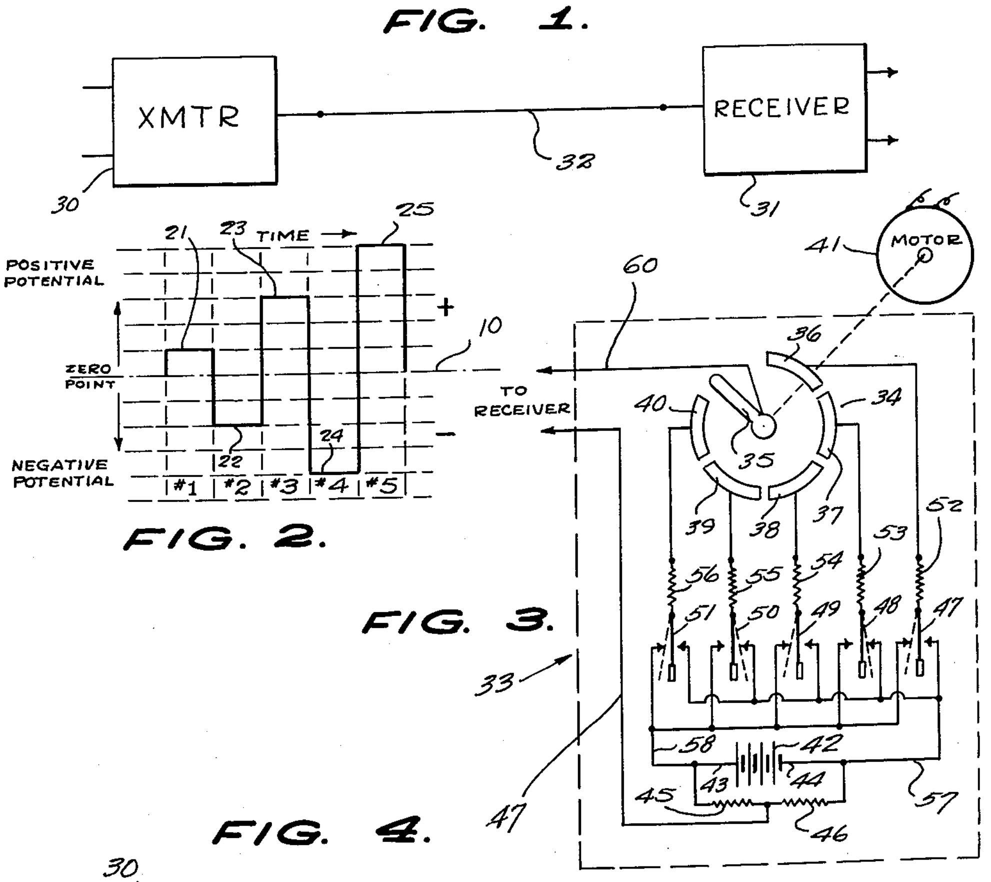
FIG. 1, FIG. 2, FIG. 3, FIG. 4
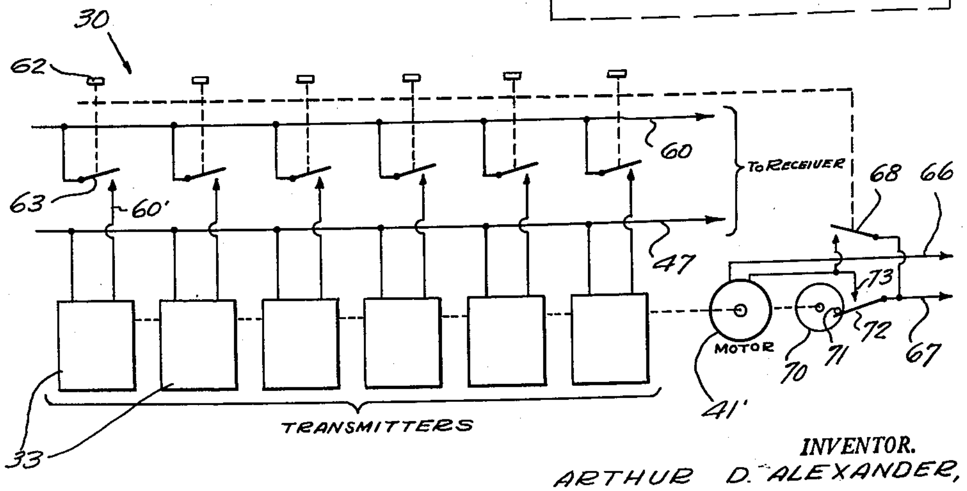
INVENTOR.
ARTHUR D. ALEXANDER,
BY
McMorrow, Berman & Davidson
ATTORNEYS United States Patent Office 3,017,460

Patented Jan. 16, 1962

3,017,460

MULTIPLE PULSE COMMUNICATION SYSTEM

Arthur D. Alexander, Detroit, Mich.
(MR—73, Rochester, Minn.)

Filed Dec. 23, 1959, Ser. No. 861,656
4 Claims. (Cl. 178—17)

This is a continuation-in-part of applicant's copending application entitled "Multiple Pulse Communicating System," Ser. No. 618,500, filed October 26, 1956, issued as Patent No. 2,926,216, February 23, 1960.

This invention relates to communication systems, and more particularly to a novel communication system employing groups of electrical pulses to represent the characters to be transmitted, each group of pulses comprising a series of pulses progressively increasing in magnitude but being arranged in polarity in a different manner for each character transmitted.

A main object of the invention is to provide a novel and improved teletypewriter system which involves relatively simple components, which requires relatively inexpensive parts, and which tolerates a much greater amount of distortion due to line characteristics or other causes than in systems previously employed in the art.

A further object of the invention is to provide an improved teletypewriter system wherein distinctive signals are provided for the various characters to be transmitted, the signals being adapted to be transmitted to a receiver arranged to respond thereto, the respective signals involving groups of no more than five impulses, and wherein the impulses can be easily and accurately decoded without dependency upon maintaining any specific time durations of the impulses or between the successive impulses.

A still further object of the invention is to provide an improved teletypewriter system wherein a series of electrical pulses is employed to transmit each character, the system involving a transmitter adapted to produce groups of impulses which consist of pulses of progressively increasing magnitude but of variable polarity, the receiver being arranged to respond to the arrangement of the pulses to organize the receiver to print the character associated with the pulses automatically when the last pulse in the series has been received, and to restore the parts thereof to normal releasing positions as soon as the received character has been printed, the receiver being thus completely under the control of the transmitted pulses.

A still further object of the invention is to provide an improved method of electrical communication wherein characters to be transmitted are represented by a series of electrical pulses progressively increasing in magnitude but having different polarity arrangements, and wherein the receiving apparatus has respective circuits responsive to the respective successive pulses, said circuits being immune to pulses of smaller magnitude than their intended pulses and being rendered immune to pulses of larger magnitude after they have been activated by said intended pulses, the method being independent of time factors, such as length of pulses and intervals between the pulses of a particular group.

Further objects and advantages of the invention will become apparent from the following description and claims, and from the accompanying drawings, wherein:

FIGURE 1 is a block diagram of a simple communication system employing a transmitter and receiver, similar to the system contemplated by the present invention.

FIGURE 2 is a graphical representation illustrating a typical series of pulses employed to transmit a character in the communication system of the present invention.

FIGURE 3 is a schematic diagram illustrating a typical character-transmitting unit which may be employed in the communication system of the present invention.

FIGURE 4 is a schematic diagram illustrating a typical character-selecting arrangement which may be employed in conjunction with transmitting units such as that shown in FIGURE 3, and wherein each transmitting unit is set to provide a series of pulses representing a particular character.

A prime purpose of the present invention is to provide a novel and improved system to automatically and independently control several different members from a remote point by the use of groups of coded pulses. As applied to communication, this system is particularly useful in telegraphy arrangements involving the conversion of the individual characters of a text message into groups of coded pulses, transmitting these pulses to a receiving and decoding device having automatic selecting means arranged to respond to said groups of coded pulses to organize the receiver to print the character associated with the pulses, and restore the parts thereof to normal release positions as soon as the received character has been printed, wherein messages may be transmitted in direct written form. This system is also applicable to automatic switching systems in which groups of code impulses are used to control members which may in turn actuate other members or electrical circuits.

The communication system of the present invention utilizes a novel type of signals for transmission of the characters, and further utilizes a novel principle for the selection of the characters by the receiving apparatus associated with the system. The type of signals utilized in the system of this invention may be termed a "differentiated-polar signal." This signal is received by and operates on a receiver mechanism through the use of suitable relay circuits and electromagnets controlled by said circuits, to set up organization of the elements of the receiver associated with the characters transmitted, such that printing of the selected characters may be accomplished.

The "differentiated-polar signal" utilized in the system of this invention is a polar type of signal comprising a series of impulses wherein each impulse has a different magnitude, and wherein, for example, the successive impulses are of increasing magnitude. For example, the series of impulses may comprise five pulses of successively increasing magnitude but having an arrangement of polarities which is unique with respect to each character to be transmitted. For example, as shown in FIGURE 2, the first pulse in the series, represented by the reference numeral 21, may be either positive or negative, corresponding to a "mark" or "space" and in the case illustrated is positive in polarity. As shown the first pulse is of specified magnitude, comprising one unit of potential. The second pulse, shown at 22, is twice the magnitude of the first pulse and may be either positive or negative, being negative in the illustrated example shown in FIGURE 2. The second pulse 22 is greater than the first pulse 21, but is not necessarily twice the magnitude of the first pulse, being merely shown as twice the magnitude for purposes of convenience in illustration.

The third pulse, shown at 23, is greater than the second pulse 22 and may be either positive or negative in polarity, being shown positive in the typical example illustrated in FIGURE 2. The magnitude of the third pulse 23 need not be a multiple of the magnitude of the first pulse 21, but is shown as three times the magnitude of pulse 21 for convenience in illustration.

The fourth pulse, shown at 24, may be either positive or negative but must have a magnitude greater than the third pulse 23. In the illustrative example shown in FIGURE 3, the fourth pulse is shown as negative and is further shown as having a magnitude four times that of the first pulse 21, for convenience in illustration.

The fifth pulse, shown at 25, is greater than the fourth pulse 24 and may have either a positive or negative polarity. In the example shown, the fifth pulse 25 has a positive polarity and is five times the magnitude of the first pulse 21.

The five pulses forming the signal may be provided by any suitable means, such as five batteries of successively increasing voltage and respective double-pole reversing switches connecting the batteries to the output line in a manner whereby the five batteries may be selectively connected to the output line with proper polarity to define the desired signal. Thus, by successively manipulating the five reversing switches, the five batteries may be successively connected to the output line with the proper polarity to define the signal to be transmitted.

As will be presently described, other types of transmitting arrangements may be employed, and a specific type will be described presently.

As will be understood, a positive pulse represents a "mark" and a negative pulse represents a "space." It can be seen from FIGURE 2 and from the above explanation that each pulse in a particular series is greater in magnitude than the preceding pulse and has either a positive potential or a negative potential, depending on whether a mark or space is desired.

Each character to be transmitted, in the system of the present invention, requires only a series of no more than five pulses, as above explained, and the transmission of the intelligence requires no start and stop pulses to precede and end each code group, as required in the previously employed teletypewriter systems of the prior art. As will be presently apparent, five or less impulses are necessary for the transmission and selection of each code group representing a specific character or function, in the system of the present invention.

A printing receiver employed in a communication system according to the present invention is described in detail in applicant's copending application Ser. No. 618,500, filed October 26, 1956, and issued as Patent No. 2,926,216, Feb. 23, 1960. This receiver represents a suitable receiving device adapted to respond to respective series of pulses of progressively increasing magnitude, each pulse having either positive or negative polarity, whereby each series of pulses represents a different character, and wherein the receiver is provided with character selecting means responsive to the relative polarity arrangement of the pulses. By referring to applicant's aforesaid copending patent application, it will be seen that the receiver involves the use of relays responding to the pulses, wherein the polar characteristics of the relays associated with the first four pulses are similar, and wherein in each stage one of the relays responds to a positive pulse and another relay responds to a negative pulse. The receiver is provided with a fifth stage containing relays which are similar in polar response to the relays of the first four stages and also activate the reset elements of the receiver as well as the printing mechanism thereof.

As is pointed out in applicant's copending patent application, above mentioned, the most outstanding advantage offered by the system of the present invention, as compared to systems of the prior art, such as conventional teletypewriter systems. Morse code systems, and picture telegraphy systems is that in the system of the present invention there are less signal elements required to transmit a given amount of intelligence. This means that the system of the present invention offers greater telegraph speeds at a given frequency assignment (more intelligence per unit of time), or that an equal amount of intelligence may be transmitted at a lower frequency assignment. Since both of these factors directly affect the cost of a communication channel, the system of the present invention is more economical than the systems heretofore employed. The system of the present invention is also more efficient than the systems previously employed in the art, since a greater number of communication circuits may be imposed on a given communication channel, by making better use of the frequency spectrum.

Another advantage offered by the system of the present invention, as compared to a teletypewriter system and a picture telegraphy system, as previously employed, is that the groups of coded pulses need not be supplemented with additional pulses, such as "start-stop" pulses or other additional pulses to maintain synchronization between the coding members in the transmitter and the decoding members in the receiver. In previously employed systems, a complete teletypewriter code group always includes a start impulse and a stop impulse. This is known as the "start-stop" system to maintain synchronization. As is pointed out in applicant's copending patent application, Ser. No. 618,500, of which the present application is a continuation-in-part, the receiving apparatus employed requires no such "start-stop" impulses. Early teleprinter systems, such as the "Siemens-Hell" did not employ the "start-stop" feature, but employed double printing of each character transmitted. If one character could not be read, the other one usually could be. In the system of the present invention, neither "start-stop" impulses nor double printing is necessary.

A novel feature of the system of the present invention is that the individual signal elements of a code group progressively increase in amplitude and are arranged in polarity to the character transmitted. Teletypewriters of the conventional type, Morse code printers, and Siemens-Hell teleprinters are not capable of receiving signals of this type.

Another novel feature of the system of the present invention is that the individual code elements of a particular group of coded pulses may be received either as a single pulse or as a series of pulses without filtering or otherwise changing the pulses before they affect the automatic selecting and decoding members related with organizing the receiver to print the character associated with a received group of pulses. In other words, a pulse carrying the intelligence of a single code element may be repeated during the transmission of a group without adversely affecting the printed character associated with that particular group of pulses. The repetition of a code element while transmitting a particular group of coded pulses is not possible in a conventional teletypewriter system, a Morse code system, or a picture telegraphy system. The repeated pulse would be mistaken for the next code element.

Another advantage offered by the system of the present invention is that there is a shorter selecting interval in the receiver than in systems previously employed in the art. In the system of the present invention, the components associated with the selection of a code element are activated when the required amplitude of the pulse representing that code element is obtained. This is pointed out in applicant's copending application Ser. No. 618,-500, above mentioned. In the system of the present invention, the components associated with the selection of a code element are activated when the required amplitude of the pulse representing that code element is obtained. In systems of the prior art, the pulse must not only attain a specific effective amplitude, but the pulse must remain at the effective amplitude for a considerable length of time, due to the fact that the selecting components of the devices of the prior art are timed with the incoming pulses by a device such as a motor within the receiver. Therefore, there must be a certain margin for error in timing.

An important still further advantage of the system of the present invention as over systems of the prior art is that selection according to the system of this invention does not depend on the relative lengths and locations of the individual signal elements of a group of coded pulses. In all telegraphy systems previously employed in the art, the quality of the received signals is determined by the relative lengths and locations of the signal elements measured after they are repeated through a receiving relay or after actuating the magnet of a receiving device, compared with the lengths and locations of the signal elements impressed at the sending end. A measurement of received telegraph signal quality does not include a measurement of the amplitude or strength of the received signal, but only on the time during which the signal is of sufficient strength to operate the receiving device. In this respect, the system of the present invention will tolerate a much greater amount of distortion than systems previously employed in the art, due to the fact that the intelligence is not in the timing.

A still further important advantage offered by the system of the present invention is that the transmitter components, while producing the groups of coded pulses, and the receiver components related to the reception and decoding of said groups of coded pulses, need not be driven by a special accurately timed spacing device, such as a constant speed motor, an oscillator, a vibrator, or other similar device having regularly controlled movement or output to maintain synchronization by keeping coding and decoding members at the same speed. In the system of the present invention, the components are not timed by a device in the receiver, but are actuated at the speed at which the signals are transmitted. The signals may be transmitted at an irregular speed, as in manual transmission of the type above described, or at regular speed, either fast or slow, and still activate their related selecting components for proper reception.

Another important advantage which may be considered as inherent in the present system, and which is primarily attributed to the characteristics of the receiver employed in the system, is that the receiving device has circuits capable of storing the intelligence of the coded pulses, and wherein said circuits associated with the storing of the intelligence contained in the last pulse are further arranged to automatically activate circuits associated with printing the character associated with the stored group of coded pulses.

A still further advantageous novel feature provided by the system of the present invention is that the receiving device, described in applicant's copending application Ser. No. 618,500, of which the present application is a continuation-in-part, has respective circuits immune to pulses of less amplitude than their intended pulses and said circuits are rendered immune to pulses of greater amplitude after having been activated by said pulses.

Referring again to the drawings, it will be seen that FIGURE 1 generally designates a communication system which comprises a transmitter 30 and a receiver 31, the receiver being of the same general type as that specifically described and illustrated in applicant's copending patent application Ser. No. 618,500, of which the present application is a continuation-in-part. The transmitter may be coupled to the receiver in any suitable manner, for example, by a wire link 32, or by a radio link, if so desired.

The details of the receiver 31 will be found in applicant's copending application Ser. No. 618,500, and therefore, it is not believed necessary to repeat said details in the present application.

As above mentioned, various types of transmitters may be employed, and the transmitter illustrated herein merely represents one specific type which is designed to produce the particular sequence of electrical pulses progressively increasing in magnitude and of variable polarity, as employed in the communication system of this invention.

FIGURE 3 illustrates diagrammatically at 33 a pulser adapted to produce a group of signal pulses to represent a particular character. The pulsing unit 33 comprises a rotary distributor 34 having a rotatable contact arm 35 and provided with the spaced arcuate contacts 36 to 40 adapted to be successively engaged by the contact arm 35 responsive to the clockwise rotation of said contact arm, as viewed in FIGURE 3. The arm 35 may be driven in any suitable manner, for example, may be mechanically coupled to a suitable motor 41. A source of direct current is provided, for example, a battery 42 having a positive terminal 43 and a negative terminal 44. Connected across the terminals 43 and 44 are the series-connected similar resistors 45 and 46, and one transmitting conductor 47 is connected to the common junction of the series-connected resistors 45 and 46. The poles 47 to 51 of five single pole-double throw, manually operated switches are connected to the respective arcuate contacts 36 to 40 through respective current modifying resistors 52 to 56. The resistors 52 to 56 are progressively lower in resistance value to provide successive pulses of progressively increasing current value, as will be presently described, responsive to the successive engagement of the contact arm 35 with the stationary arcuate contacts 36 to 40.

The right hand stationary contacts associated with the switch poles 47 to 51 are respectively connected to a negative battery conductor 57, which is connected to the negative terminal 44 of the battery 42. The left hand stationary contacts associated with the respective switches 47 to 51 are similarly connected to a positive conductor 58 which is connected to the positive terminal 43 of battery 42. Thus, the switch poles 47 to 51 may be set in various relative positions, corresponding to the particular character to be transmitted. For example, if the poles are set in the dotted view positions illustrated in FIGURE 3, a series of pulses such as that illustrated in FIGURE 2 will be developed across the output conductors 47 and 60 of the transmitting unit 33 responsive to one complete rotation of the contact arm 35.

As shown in FIGURE 3, the rotary contact arm 35 is connected to the output conductor 60, whereas the other output conductor 47 is connected to the junction of the series-connected resistors 45, 46, as above mentioned. With pole 47 in its dotted view position, in FIGURE 3, when the contact arm 35 engages the stationary contact 36, the conductor 60 will be connected to the positive terminal 43 of battery 42 by a circuit comprising wire 60, arm 35, contact 36, resistor 52, pole 47, and conductor 58. This provides the pulse 21 which is of positive polarity and which is of minimum amplitude, as illustrated in FIGURE 2. The next pulse 22 is developed when the arm 35 engages the stationary arcuate contact 37, said next pulse 22 being negative, since the pole 48 will be in contact with the right hand stationary contact element associated therewith, which connects the pole to the negative terminal 44 of battery 42 through the conductor 57.

As will be readily apparent, any one of the transmitted characters may be thus represented by suitably positioning the switch poles 47 to 51 so as to engage either their right hand or left hand contacts, as viewed in FIGURE 3, and the transmitting unit 33 of FIGURE 3 may thus be employed to successively transmit different groups of pulses by successively varying the arrangement of the switch poles 47 to 51.

FIGURE 4 illustrates a more convenient arrangement wherein respective transmitting units 33 are provided, each unit being preset to develop a series of pulses corresponding to a given character. The respective transmitting units 33 are selectively connected to the output conductors 47 and 60 by suitable selecting means, comprising keys 62 which are mechanically coupled to control switches 63 provided in the respective output conductors, shown at 60', associated with the transmitting unit 33. The output conductors 60' are connected to the rotating contact arms 35 of the respective transmitting units, and are connected to the output line conductors 60 when their associated switch members 63 are closed. A common motor 41' may be utilized to drive the respective rotary switch arms 35 of the transmitting unit 33, the motor being energized responsive to the closure of any one of the transmitting unit switches 63. Thus, the motor 41' may be energized from a pair of supply conductors 66 and 67 connected to a suitable source of electric current. One of the conductors 66 is connected to one terminal of the motor. The other conductor 67 is connected to the remaining motor terminal through a normally open switch 68 which is mechanically coupled to the character-selecting keys 62 so as to be closed when any one of the keys is actuated. Thus, the switch 68 is shown as a single pole, single throw switch which is mechanically linked to the transmitting unit switches 63 so as to be closed synchronously with the closure of any one of the switches 63, but obviously, any other suitable type of electrical arrangement may be employed to close the circuit of motor 41' when any key 62 is actuated. For example, double pole switches may be employed instead of the single pole switches 63, one pole and the associated contact of each switch being utilized as the circuit-closing means for the driving motor 41'.

In order to limit rotation of the switch pole 35 of a selected transmitting unit 33 to one complete revolution, the motor 41' may be provided with limit switch means comprising a disc member 70 connected to the motor shaft and provided with a pin element 71 adjacent its periphery which is engageable with a yieldable spring contact arm 72 when the motor shaft reaches a position corresponding to the position of the contact arm 35 illustrated in FIGURE 3. The spring contact arm 72 is engageable with a stationary contact 73 when the pin 71 has moved past the spring arm 72, so as to make contact therewith in all positions of arm 35 of the transmitter unit 33 except when said arms have moved past the last arcuate contact element 40 associated therewith. The contact pole 72 and its associated stationary contact element 73 are connected across the motor control switch in the motor energizing line conductor 67, as shown in FIGURE 4, whereby the control switch is shunted by the contact elements 72 and 73 in all positions of the motor shaft except the position corresponding to that illustrated in FIGURE 3 wherein the contact arms 35 have been rotated past the last arcuate contact element 40 associated therewith. Thus, when a selected key is depressed, its associated switch 63 is closed, connecting its associated transmitting unit 33 to the output line conductor 60 and simultaneously energizing the motor 41'. This causes the pin 71 to rotate past the limit switch arm 72 and allows arm 72 to engage its associated stationary contact 73, keeping the motor 41' energized for at least one revolution thereof. This causes a series of pulses, corresponding to the selected character, to be generated and applied to the output conductors 47 and 60 of the transmitting station. Motor 41' will automatically become deenergized at the completion of the transmission of the selected series of pulses unless the associated key 62 is maintained in its depressed position, which will cause a repetition of the selected series of pulses. Thus, if a particular key 62 is held depressed for a period of time, a series of identical groups of pulses will be transmitted, causing the transmission of the same character repeatedly. When the key 62 is released, the switch 68 opens and the motor 41' will become deenergized when the pin element 71 engages the resilient limit switch arm element 72 and causes said arm element to disengage from its associated stationary contact 73.

As above mentioned, the transmitter specifically described herein merely represents one particular embodiment of a suitable apparatus which may be devised to develop the succession of electrical pulses, progressively increasing in magnitude and of variable polarity, in accordance with a character to be transmitted.

While a specific embodiment of an improved method and means for teletypewrite communication has been disclosed in the foregoing description, it will be understood that various modifications within the spirit of the invention except as defined by the scope of the appended fore, it is intended that no limitations be placed on the invention except as defined by the scope of the appended claims.

What is claimed is:

1. In a system of communication of the character described, means to generate a succession of direct current pulses of increasing amplitude, and means to vary the polarity of the pulses in accordance with a character to be transmitted while maintaining the amplitudes of the respective pulses substantially constant.

2. In a communication system of the type wherein respective pulse groups each comprising a succession of pulses are transmitted to a receiver adapted to discriminate between and respond to the respective pulse groups, a transmitter comprising a source of direct current, a line, means to sequentially connect said source of current to said line, means to modulate the current in the line so as to increase the amplitude of the current each time the source is connected to the line, and means to at times reverse the polarity of the current during the sequence of connections of said source to the line.

3. In a communication system of the type wherein respective pulse groups each comprising a succession of pulses are transmitted to a receiver adapted to discriminate between and respond to the respective pulse groups, a transmitter comprising a source of direct current, a line, means to sequentially connect said source of current to said line a predetermined number of times, whereby to generate a predetermined number of direct current pulses in said line, means to successively increase the amplitude of the current each time the source is connected to the line, and means to reverse the polarity of certain of the pulses during the sequence of connections of said source to the line in accordance with a character to be transmitted.

4. In a system of communication of the charatcer described, a pulser comprising a direct current source, a pair of line conductors, means to sequentially connect said source to said line conductors a predetermined number of times, means to interpose resistance of decreasing value between said source and said line conductors during the successive connections of the source to the conductors, whereby to successively increase the amplitude of the current pulses obtained by said connections, and means to reverse the polarity of selected ones of said current pulses in accordance with a character to be transmitted by the pulser.

No references cited.